US006305738B1

(12) United States Patent
Gehringhoff et al.

(10) Patent No.: US 6,305,738 B1
(45) Date of Patent: Oct. 23, 2001

(54) DOOR FRAME FOR A MOTOR VEHICLE

(75) Inventors: Ludger Gehringhoff; Christian Smatloch; Dieter Töpker, all of Paderborn (DE)

(73) Assignee: Benteler AG, Paderborn (DE)

( * ) Notice: Subject to any disclaimer, the term of this patent is extended or adjusted under 35 U.S.C. 154(b) by 0 days.

(21) Appl. No.: 09/441,762

(22) Filed: Nov. 17, 1999

(30) Foreign Application Priority Data

Nov. 17, 1998 (DE) ................................................ 198 52 976

(51) Int. Cl.[7] ............................... B60J 5/04; B60R 21/12
(52) U.S. Cl. .................... 296/146.6; 296/188; 296/146.5
(58) Field of Search .......................... 296/146.5, 146.6, 296/188, 189; 148/332, 333, 334, 525

(56) References Cited

U.S. PATENT DOCUMENTS

| 4,708,390 | * | 11/1987 | Palentyn et al. ...................... 296/188 |
| 5,093,990 | * | 3/1992 | Klippel ................................ 296/188 |
| 5,094,034 | * | 3/1992 | Freeman ............................ 296/146.6 |
| 5,171,058 | * | 12/1992 | Ishikawa et al. ..................... 296/189 |
| 5,277,469 | * | 1/1994 | Klippel ............................. 296/146.6 |
| 5,404,690 | * | 4/1995 | Hanf ................................. 296/146.6 |
| 5,527,082 | * | 6/1996 | Topker et al. .................... 296/146.6 |
| 5,580,120 | * | 12/1996 | Nees et al. ........................ 296/146.6 |
| 5,756,167 | * | 5/1998 | Tamura et al. .......................... 428/31 |
| 5,785,376 | * | 7/1998 | Nees et al. ........................ 296/146.6 |
| 5,813,719 | * | 9/1998 | Kowalski .......................... 296/146.6 |
| 5,820,202 | * | 10/1998 | Ju ...................................... 296/146.6 |
| 5,857,734 | * | 1/1999 | Okamura et al. ..................... 296/189 |
| 5,862,877 | * | 1/1999 | Horton et al. ........................ 180/312 |
| 5,868,456 | * | 2/1999 | Kowalski et al. ................. 296/146.6 |
| 5,997,077 | * | 12/1999 | Siebels et al. ....................... 296/189 |
| 6,015,182 | * | 1/2000 | Weissert et al. .................. 296/146.6 |

FOREIGN PATENT DOCUMENTS

| 195 40 187 A1 | 4/1997 | (DE) . |
| 2257449 | 8/1975 | (FR) . |

OTHER PUBLICATIONS

Automobil Revue, 1988, vol. 19, pp. 38–39.

* cited by examiner

Primary Examiner—Stephen T. Gordon
Assistant Examiner—Greg Blankenship
(74) Attorney, Agent, or Firm—Friedrich Kueffner

(57) ABSTRACT

A door frame for motor vehicles includes a window channel laterally defined by an outer door panel and an inner door panel, wherein the outer door panel and the inner door panel are provided adjacent of the window opening with longitudinally extending stiffening or reinforcement members located in the window channel. The reinforcement members are circumferentially closed tubular sections having an essentially oval cross-section, wherein the reinforcement members are adapted in their shape to the inner surfaces of the outer door panel and the inner door panel.

10 Claims, 2 Drawing Sheets

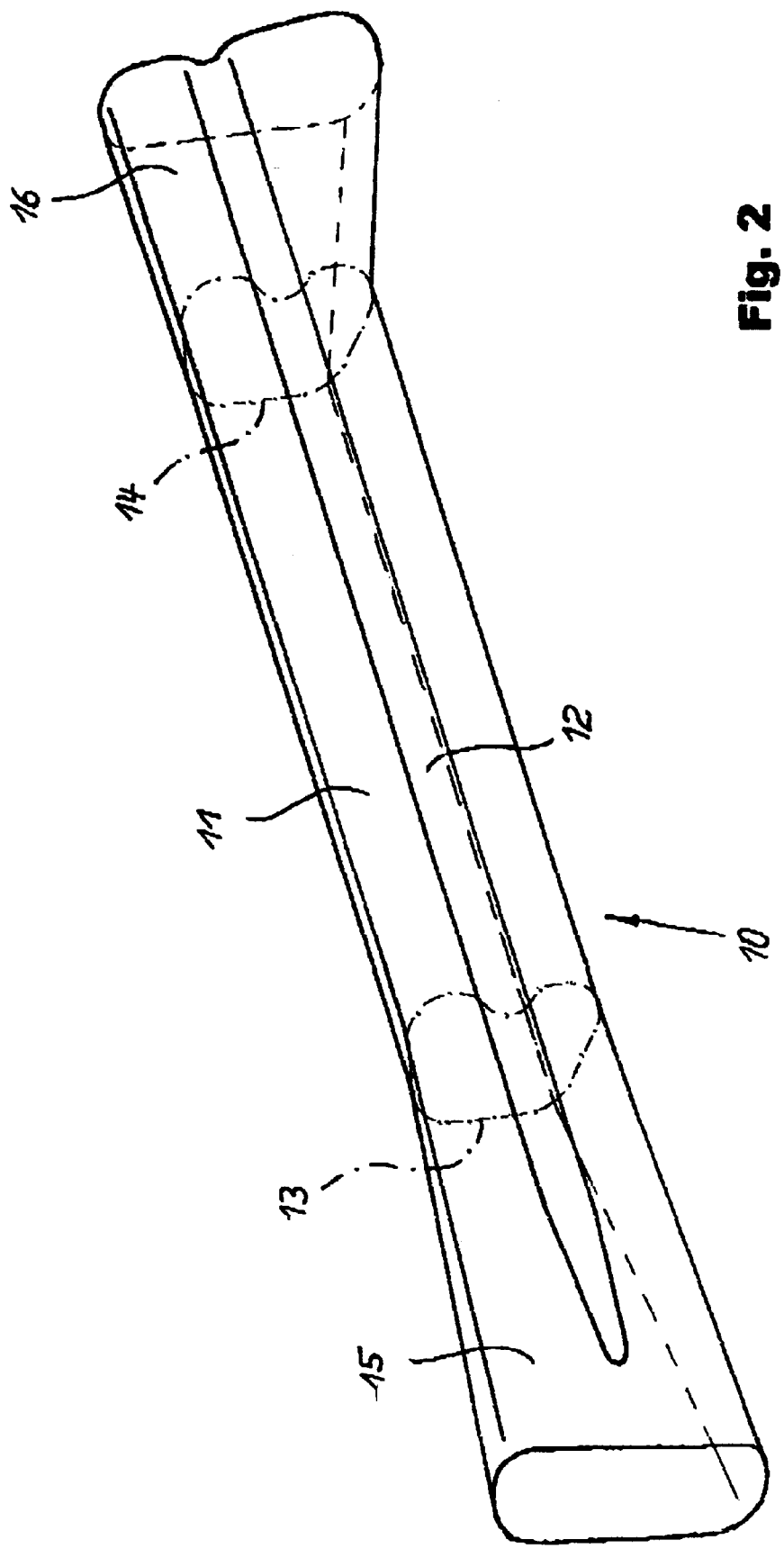

DOOR FRAME FOR A MOTOR VEHICLE

BACKGROUND OF THE INVENTION

1. Field of the Invention

The present invention relates to a door frame for motor vehicles which includes a window channel laterally defined by an outer door panel and an inner door panel, wherein the outer door panel and the inner door panel are provided adjacent to the window opening with longitudinally extending stiffening or reinforcement members located in the window channel.

2. Description of the Related Art

The configuration of the window channel of a door frame for a motor vehicle is of particular importance when the effects of front or rear collisions are to be taken into consideration as the most frequent accidents. Moreover, when constructing the window channel, it is also important to take into consideration the stresses occurring during a side impact.

For example, the longitudinal forces resulting from a frontal crash are conducted through longitudinal girders/beams and through the upper longitudinal girder, the A-column and the window channel into the rear portion of the vehicle. The window channel forms the most important structural component in this respect because it must stabilize the passenger cell. The window channel is particularly stressed with respect to buckling and bending. Buckling of the window channel must never occur.

The window channel is formed towards the outside by an outer door panel and towards the passenger cell by an inner door panel. In the past, a plurality of stiffening or reinforcement members have been integrated into the window channel for achieving a stable construction of the window channel. These reinforcement members are composed of deformed sheet metal pieces which are mounted in the longitudinal direction of the vehicle adjacent the window opening located above the window channel and on the oppositely located surfaces of the outer door panel and the inner door panel. The reinforcement members are usually attached by spot welding. Moreover, additional reinforcement sheet metal pieces (corner plates) are provided in the areas of the frame walls forming the front and end of the window channel.

First of all, this known construction has the disadvantage that a large number of reinforcement members are used. Also, because of their open configuration, the stiffness with respect to buckling and bending of the reinforcement members is limited. Moreover, there is the danger that the elastic joints between the individual reinforcement members may open when loads occur.

SUMMARY OF THE INVENTION

Therefore, starting from the prior art discussed above, it is the primary object of the present invention to provide a window channel for a door frame of a motor vehicle with reinforcement members which are configured in such a way that the number of components required is reduced and the weight of the components is also reduced, while the stiffness with respect to buckling and bending is increased and the manufacture and assembly are made simpler.

In accordance with the present invention, the reinforcement members are circumferentially closed tubular sections having an essentially oval cross-section, wherein the reinforcement members are adapted in their shape to the inner surfaces of the outer door panel and the inner door panel.

As a result of the configuration according to the present invention, only a single structural component as a reinforcement member in the form of an essentially oval and circumferentially closed tubular section is located at each of the surfaces of the outer door panel and inner door panel which face each other. These reinforcement members have a contour which is adapted to these surfaces.

In comparison to conventional configurations of sheet metal pieces, such tubular reinforcement members have the advantage that they have the highest stiffnesses with respect to buckling and bending. Elastic or resilient joints which could open during the application of loads no longer exist.

Another advantage is the fact that the cross-sections of the reinforcement members can be adapted in an optimum manner using very economical methods to the maximum loads to be expected as well as to the structural space available in a window channel. It is possible in this connection to realize very precise reinforcement members which only have low tolerances.

In addition, the weight of the reinforcements is significantly reduced because the number of reinforcement members has been reduced and the oval tubular configuration results in a higher stiffness as compared to embossed sheet metal pieces.

It is conceivable to use as reinforcement members conventionally profiled tubes which have an essentially constant cross-section. However, in accordance with a preferred embodiment, the reinforcement members are formed by tubular sections which have been deformed by means of hydraulic high internal pressure deformation. This type of deformation is extremely useful in the case of complicated cross-sections which change over the length thereof.

In accordance with another feature, the reinforcement members can be provided with longitudinal stiffening corrugations or beads which preferably extend over the surface areas facing the window channel. In particular, the beads are longitudinal beads with rounded cross-sections. In this manner, it is possible to take into consideration specific requirements.

In accordance with another advantageous development of the basic concept of the present invention, the end portions of the reinforcement members are conically widened. This makes it possible to achieve large widened portions of the tubular sections at the ends of the reinforcement members. This also makes it possible to achieve an extremely stiff connection to the end walls of the door frame forming the window channel. Additional corner plates, as they were required in conventional reinforcements, are not necessary.

Since the contours of the reinforcement members are adapted to the surfaces of the outer door panel and the inner door panel which face each other, it is possible to connect the reinforcement members by means of slot welding or laser welding to the outer door panel as well as to the inner door panel and possibly also to the walls of the door frame which form the end of the window channel.

Instead of welding, another feature of the present invention provides that a joining procedure utilizing adhesives can also be used.

Of course, a combined joining and welding procedure is also conceivable.

In accordance with another feature, the reinforcement members may be of a high-strength carbon steel.

Also conceivable are reinforcement members of surface-refined or surface-improved steel.

In accordance with a particularly advantageous embodiment, the reinforcement members are made of a steel having the following composition in percent by weight:

| | |
|---|---|
| Carbon | 0.23–0.27 |
| Silicon | 0.15–0.30 |
| Manganese | 1.10–1.40 |
| Phosphorus | max. 0.25 |
| Sulphur | max. 0.01 |
| Chromium | 0.10–0.35 |
| Molybdenum | 0.10–0.35 |
| Copper | max. 0.10 |
| Aluminum | 0.03–0.05 |
| Titanium | 0.03–0.05 |
| Bromide | 0.002–0.003, | the remainder being iron including impurities due to smelting.

A steel of this type facilitates an energy absorption with optimum weight, with the steel having a yield strength>1,100 N/mm$^2$, a tensile strength greater than 1,400 N/mm$^2$ and an elongation>8%.

In accordance with yet another feature, other deformable materials can be used, such as, aluminum alloys.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 2 is a perspective view, on a larger scale, showing another embodiment of a reinforcement member for the window channel of FIG. 1.

DESCRIPTION OF THE PREFERRED EMBODIMENTS

Figure 1:
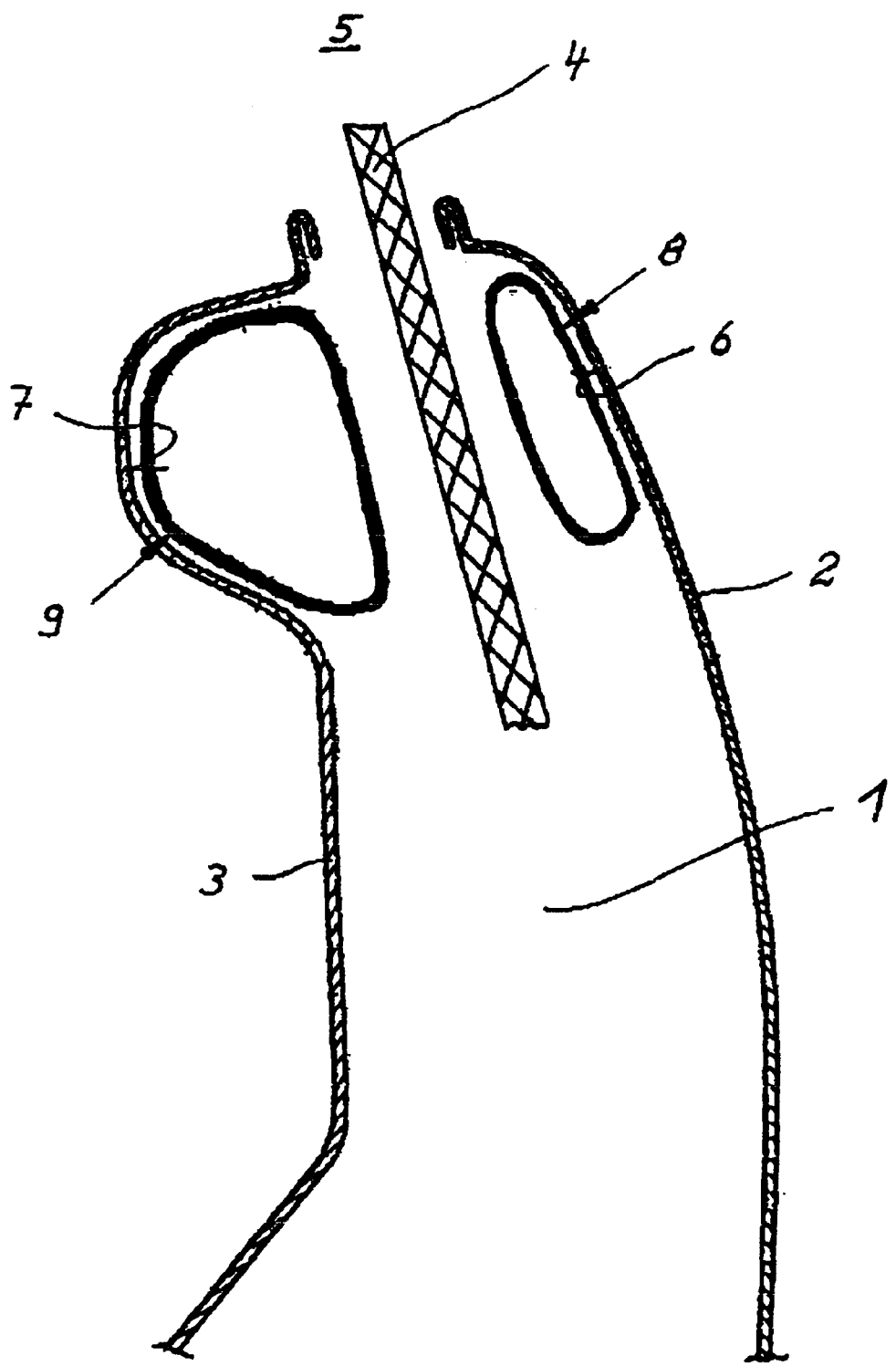
FIG. 1 is a schematic vertical cross-sectional view of a window channel of a door frame for a motor vehicle.

FIG. 1 of the drawing shows a window channel 1 of a door frame, not illustrated in detail, for a motor vehicle. The window channel 1 is defined at its sides by a curved outer door panel 2 and by a curved inner door panel 3. The window channel 1 serves to receive a window pane 4.

Provided adjacent the window opening 5 located above the window channel 1 are tubular reinforcement members 8, 9 which are adapted to the surfaces 6, 7 of the outer door panel 2 and the inner door panel 3 which face each other. The reinforcement members 8, 9 have essentially oval cross-sections formed by a hydraulic internal high pressure deformation of circumferentially closed tubular sections.

Since the reinforcement members 8, 9 are adapted in their shape to the surfaces 6, 7 of the outer door panel 2 and the inner door panel 3, they can be attached to the surfaces 6, 7 by gluing. It can also be seen that the cross-sections of the reinforcement members can be adapted in an optimum manner to the available structural space in dependence on the maximum loads to be expected.

Moreover, the reinforcement members 8, 9 can be attached with their end faces, not shown, to the end walls, also not shown, of the window channel 1.

FIG. 2 shows an embodiment of a reinforcement member 10 in which a longitudinal stiffening corrugation 12 having a rounded cross-section is worked into a long side 11 of the reinforcement member 10. This results in cross-sections 13, 14 shown in dash-dot lines.

It can also be seen in FIG. 2 that the end portions 15, 16 of the reinforcement member 10 are conically widened. The end portions of the reinforcement members 8, 9, not shown in the drawing, can also be widened in this manner in order to ensure a stiff connection to the end walls of the window channel 1.

While specific embodiments of the invention have been shown and described in detail to illustrate the inventive principles, it will be understood that the invention may be embodied otherwise without departing from such principles.

We claim:

1. A door frame for a motor vehicle with a window channel defined laterally by an outer door panel and an inner door panel, wherein the outer door panel and the inner door panel are provided adjacent to a window opening with longitudinally extending reinforcement members located in the window channel opposite and separate from one another, wherein the reinforcement members are comprised of circumferentially closed tubular sections having an essentially oval cross-section and having contours adapted to inner surfaces of the outer door panel and of the inner door panel.

2. The door frame according to claim 1 wherein the reinforcement members are comprised of tubular sections shaped by hydraulic internal high pressure deformation.

3. The door frame according to claim 1, wherein the reinforcement members have longitudinal stiffening corrugations.

4. The door frame according to claim 1, wherein the reinforcement members have conically widened end portions.

5. The door frame according to claim 1, comprising slot welded or laser welded connections between the reinforcement members and the outer door panel, the inner door panel and each wall of the door frame forming an end of the window channel.

6. The door frame according to claim 1, comprising glued connections between the reinforcement members and the outer door panel, the inner door panel and each wall of the door frame forming an end of the window channel.

7. The door frame according to claim 1, wherein the reinforcement members are of a high-strength carbon steel.

8. The door frame according to claim 1, wherein the reinforcement members are of a surface-refined steel.

9. The door frame according to claim 1, wherein the reinforcement members are of a steel having the following composition in percent by weight:

| | |
|---|---|
| Carbon | 0.23–0.27 |
| Silicone | 0.15–0.30 |
| Manganese | 1.10–1.40 |
| Phosphorus | max. 0.25 |
| Sulfur | max. 0.01 |
| Chromium | 0.10–0.35 |
| Molybdenum | 0.10–0.35 |
| Copper | max. 0.10 |
| Aluminum | 0.03–0.05 |
| Titanium | 0.03–0.05 |
| Bromide | 0.002–0.003, | the remainder being iron including impurities due to smelting.

10. The door frame according to claim 1, wherein the reinforcement members are of an aluminum alloy.

* * * * *